(12) United States Patent
Weinflash et al.

(10) Patent No.: US 7,383,227 B2
(45) Date of Patent: Jun. 3, 2008

(54) DATABASE FOR CHECK RISK DECISIONS POPULATED WITH CHECK ACTIVITY DATA FROM BANKS OF FIRST DEPOSIT

(75) Inventors: Laura E. Weinflash, Scottsdale, AZ (US); Larry W. Spooner, Green Valley, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 1285 days.

(21) Appl. No.: 10/144,740

(22) Filed: May 14, 2002

(65) Prior Publication Data

US 2003/0217003 A1    Nov. 20, 2003

(51) Int. Cl.
    *G06Q 40/00* (2006.01)
(52) U.S. Cl. .............................. 705/45; 705/1; 705/33; 235/7 R; 382/137
(58) Field of Classification Search ................ 235/379, 235/7 R; 705/38, 39, 35, 1, 33, 45; 382/137
    See application file for complete search history.

(56) References Cited

U.S. PATENT DOCUMENTS

| | | | | |
|---|---|---|---|---|
| 5,093,787 A | * | 3/1992 | Simmons ..................... | 705/33 |
| 5,175,682 A | | 12/1992 | Higashiyama et al. | |
| 5,201,010 A | * | 4/1993 | Deaton et al. .............. | 382/139 |
| 5,225,978 A | * | 7/1993 | Petersen et al. .............. | 705/33 |
| 5,265,007 A | | 11/1993 | Barnhard, Jr. et al. | |
| 5,412,190 A | * | 5/1995 | Josephson et al. ............ | 705/45 |
| 5,448,471 A | * | 9/1995 | Deaton et al. ................. | 705/14 |
| 5,649,115 A | * | 7/1997 | Schrader et al. .............. | 705/33 |
| 5,679,938 A | * | 10/1997 | Templeton et al. ......... | 235/379 |
| 5,679,940 A | * | 10/1997 | Templeton et al. ......... | 235/380 |
| 5,732,400 A | * | 3/1998 | Mandler et al. .............. | 705/26 |
| 5,783,808 A | * | 7/1998 | Josephson .................... | 235/379 |
| 5,801,366 A | * | 9/1998 | Funk et al. ................. | 235/380 |
| 5,819,236 A | | 10/1998 | Josephson | |
| 5,832,464 A | * | 11/1998 | Houvener et al. ............ | 705/45 |
| 6,059,185 A | * | 5/2000 | Funk et al. .................. | 235/379 |
| 6,078,905 A | * | 6/2000 | Pich-LeWinter .......... | 705/36 R |
| 6,088,682 A | * | 7/2000 | Burke .......................... | 705/17 |
| 6,105,007 A | * | 8/2000 | Norris .......................... | 705/38 |
| 6,119,103 A | * | 9/2000 | Basch et al. .................. | 705/35 |
| 6,164,528 A | * | 12/2000 | Hills et al. ................... | 235/379 |
| 6,189,785 B1 | * | 2/2001 | Lowery ....................... | 235/379 |
| 6,282,523 B1 | * | 8/2001 | Tedesco et al. ............... | 705/45 |

(Continued)

OTHER PUBLICATIONS

Jesse Snyder, The Bad Check Blizzard, Dec. 1996, Collections & Credit Risk, Dec. 1996, p. 27+.*

(Continued)

Primary Examiner—James P. Trammell
Assistant Examiner—Jamie H Swartz
(74) Attorney, Agent, or Firm—Townsend and Townsend and Crew LLP (57) ABSTRACT

A plurality of banks of first deposit provide checking account activity data for both transit items (checks received for deposit that need to be cleared) and incoming returns (bounced checks) to a statistical model which determines from the data the likelihood that a check from a specific checking account will be returned. This data is used to populate a database of checking accounts to be used for making check risk decisions, such as check hold policy decisions, check acceptance decisions, and open to buy decisions.

9 Claims, 12 Drawing Sheets

U.S. PATENT DOCUMENTS

| | | | |
|---|---|---|---|
| 6,311,165 B1* | 10/2001 | Coutts et al. | 705/21 |
| 6,328,207 B1* | 12/2001 | Gregoire et al. | 235/379 |
| 6,354,491 B2* | 3/2002 | Nichols et al. | 235/379 |
| 6,360,210 B1* | 3/2002 | Wallman | 705/36 R |
| 6,374,231 B1* | 4/2002 | Bent et al. | 705/36 R |
| 6,464,134 B1* | 10/2002 | Page | 235/379 |
| 6,547,129 B2* | 4/2003 | Nichols et al. | 235/379 |
| 6,647,376 B1* | 11/2003 | Farrar et al. | 705/45 |
| 6,695,204 B1* | 2/2004 | Stinson et al. | 235/379 |
| 6,754,640 B2* | 6/2004 | Bozeman | 705/40 |
| 6,757,664 B1* | 6/2004 | Cardinal et al. | 705/38 |
| 6,786,398 B1* | 9/2004 | Stinson et al. | 235/379 |
| 6,814,282 B2* | 11/2004 | Seifert et al. | 235/379 |
| 6,856,965 B1* | 2/2005 | Stinson et al. | 705/21 |
| 6,886,742 B2* | 5/2005 | Stoutenburg et al. | 235/379 |
| 7,000,828 B2* | 2/2006 | Jones | 235/379 |
| 7,016,524 B2* | 3/2006 | Moore | 382/137 |
| 7,020,639 B1* | 3/2006 | Slater | 705/75 |
| 7,177,846 B2 | 2/2007 | Moenickheim et al. | |
| 2002/0073019 A1* | 6/2002 | Deaton | 705/38 |
| 2002/0095360 A1* | 7/2002 | Joao | 705/30 |
| 2002/0120846 A1* | 8/2002 | Stewart et al. | 713/168 |
| 2003/0217003 A1* | 11/2003 | Weinflash et al. | 705/42 |

OTHER PUBLICATIONS

"BB&T, Star Systems and International Check Services Successfully Complete First Safecheck Transactions," News Release dated Aug. 24, 2000, printout from web site: http://www.intlcheck.com/pages/pressrel20000824.html, printout date: Mar. 4, 2002, 2 pages.

"STAR CHEK Goes Live with Online Check Verification," News Release dated Jan. 16, 2001 Star Systems, Inc., printout from web site: http://www.star-systems.com/cfm/news-press.cfm?id=42, printout date: Feb. 20, 2002, 3 pages.

PPS—Deposit Chek® "Deposit Chek," printout from web site: http://.64.78.123/dchek.htm, printout date: Mar. 20, 2002, 2 pages.

PPS Deposit Chek® "Preventing Check Losses at Credit Unions," dated Sep. 20, 2001, 2 pages.

"Financial Institution Letters, Special Alert," dated Mar. 22, 2000 printout from FDIC, web site: http://www.fdic.gov/news/financial/2000/fil0019.html, printout date: Mar. 8, 2002, 1 page.

"Thomson Bank InfoLink", Thomson Financial Publishing, 2 pages, date unknown.

"eFunds Counts on SAS to Lower Risks for Banks and Retailers," printout from SAS web site: http://www.sas.com/news/success/efunds.html, printout date: Mar. 8, 2002, 3 pages.

"About ChexSystems," printout from ChexSystems web site: http://www.chexhelp.com/english/publik/about.htm, printout date: Mar. 8, 2002, 1 page.

"ChexSystems And Deluxe Corp.," printout from CardReport web site: http://www.cardreport.com/overview/bureaus/chexsystems.html, printout date: Mar. 8, 2002, 3 pages.

"Electronic Clearing House to Power Point-of-Sale Check Service Program," ECHO Press Release dated Jul. 16, 2001 printout from web site: http://www.echo-inc.com/press_115.html, printout date: Mar. 12, 2002, 3 pages.

"TeleCheck® Verification Services," printout from TeleCheck web site: http://www.telecheck.com/products/verification.html, printout date: Mar. 8, 2002, 1 page.

"SCAN[SM] and SCAN OnLine[SM]," printout from eFUNDS, web site: http://www.efunds.com/us/en/solutions/comp_a2z/pm/001118.cnt, printout date: Mar. 4, 2002, 1 page.

SCAN Consumer Help, "Welcome to the SCAN[SM] Consumer Assistance Center," Deposit Payment Protection Services, Inc. copyright date: 1999, printout from web site: http://www.scanassist.com/scanassist.html, printout date: Mar. 8, 2002, 2 pages.

CheckAGAIN Product Information, "Centralized Returns." printout from CheckAGAIN, LLC web site: http://www.checkagain.com/returns.asp printout date: Mar. 8, 2002, 1 page.

CheckAGAIN Product Information, "Check Authorizations." printout from CheckAGAIN, LLC web site: http://www.checkagain.com/authorizations.asp, printout date: Mar. 8, 2002, 1 page.

"CheckAGAIN Adds Leading National Authorization Database to Services", News Release dated Jan. 30, 2001, printout from CheckAGAIN, LLC web site: http://www.checkagain.com/press010301.asp printout date: Mar. 8, 2002, 2 pages.

"CheckAGAIN Adds ECHO's NCIS Database to Service," News Release from ECHO dated Mar. 27, 2001, 1 page.

"Operation Gold Rush Leads to Arrest of Eight Defendants Charged in Massive Credit Card Scam that Cost Banks up to $15 Million," News release No. 99-038 from Department of Justice, Feb. 23, 1999, 2 pages.

"Compliance with Regulation CC," printout from The Federal Reserve Board web site, http://www.federalreserve.gov/pubs/regcc/regcc/htm, last update of web site page: Jul. 25, 2001, printout date: Apr. 18, 2002, 6 pages.

* cited by examiner

TRANSIT ITEMS

| ROUTING AND TRANSIT NO. | ACCOUNT NUMBER | SERIAL NUMBER (CHECK NUMBER) | |
|---|---|---|---|
| 111111111 | 453221 | 1225 | ← Participant (drop) |
| 111111111 | 643562 | 4362 | ← Participant (drop) |
| 444444444 | 322650 | 4366 | ← Non-participant (keep) |
| 111111333 | 423455 | 5322 | ← Non-participant (keep) |
| 266666781 | 136477 | 1001 | ← Participant (drop) |

INCOMING RETURNS

| ROUTING AND TRANSIT NO. | ACCOUNT NUMBER | SERIAL NUMBER (CHECK NUMBER) | REASON FOR RETURN | |
|---|---|---|---|---|
| 111111111 | 453221 | 1224 | NSF | ← Participant (drop) |
| 444444444 | 322650 | 4364 | CLOSED | ← Non-participant (keep) |

FIG. 8

TRANSIT ITEMS

| ROUTING AND TRANSIT NO. | ACCOUNT NUMBER | SERIAL NUMBER (CHECK NUMBER) | |
|---|---|---|---|
| 111111111 | 453221 | 1230 | ← Participant (send to 10) |
| 111111111 | 643562 | 4365 | ← Participant (send to 10) |
| 444444444 | 322650 | 4400 | ← Non-participant (send to 20) |
| 111111333 | 423455 | 5323 | ← Non-participant (send to 20) |
| 266666781 | 136477 | 1011 | ← Participant (send to 10) |

FIG. 9

HISTORICAL QUEUE (ACCOUNT HISTORY)

| R&T | ACCOUNT NUMBER | DATE | SERIAL NUMBER (CHECK NUMBER) | DOLLAR AMOUNT | RETURN | REASON FOR RETURN |
|---|---|---|---|---|---|---|
| 1122 | 123456 | 5/5/02 | 3333 | 12.50 | RETURN | CLOSED |
| 1122 | 123456 | 4/30/02 | 3332 | 100.00 | RETURN | CLOSED |
| 1122 | 123456 | 2/15/02 | 3300 | 45.00 | RETURN | NSF |
| 1122 | 123456 | 1/30/02 | 3299 | 95.00 | | |
| 1333 | 344444 | 5/4/02 | 2630 | 56.90 | | |
| 1333 | 344444 | 5/2/02 | 2633 | 1,246.80 | | |
| 1333 | 344444 | 4/28/02 | 2635 | 556.90 | | |
| 1445 | 164456 | 4/26/02 | 1454 | 67.00 | RETURN | NSF |
| 1445 | 164456 | 4/20/02 | 1450 | 2,555.30 | | |
| 1445 | 164456 | 4/15/02 | 1442 | 376.88 | | |
| 1445 | 543200 | 4/26/02 | 1600 | 34.99 | | |

→ Also, place in HOLD QUEUE

ACCOUNT SCORES
(produced by HISTORICAL QUEUE)

| R&T | ACCOUNT NUMBER | SCORE (1-10*) | REASON CODES |
|---|---|---|---|
| 1122 | 123456 | 10 | NSF, CLOSED |
| 1333 | 344444 | 2 | PAST EXPERIENCE |
| 1445 | 164456 | 8 | NSF |
| 1445 | 543200 | U | INSUFFICIENT EXPERIENCE |

— NPDB

* KEY
10 = highest risk
1 = lowest risk
U = unscoreable

FIG. 10

RESCORE PROCESS

HISTORICAL QUEUE (ACCOUNT HISTORY)

| R&T | ACCOUNT NUMBER | DATE | SERIAL NUMBER (CHECK NUMBER) | DOLLAR AMOUNT | RETURN | REASON FOR RETURN |
|---|---|---|---|---|---|---|
| ... | | | | | | |
| 1445 | 164456 | 5/1/02 | 1455 | 24.95 | RETURN | NSF |
| 1445 | 164456 | 4/26/02 | 1454 | 67.00 | RETURN | NSF |
| 1445 | 164456 | 4/20/02 | 1450 | 2,555.30 | | |
| 1445 | 164456 | 4/15/02 | 1442 | 376.88 | | |
| ... | | | | | | |

← NEW DATA

ACCOUNT SCORES
(produced by HISTORICAL QUEUE)

| ACCOUNT NUMBER | SCORE (1-10) | REASON CODES |
|---|---|---|
| 123456 | 10 | NSF, CLOSED |
| 344444 | 2 | |
| 164456 | 9 | NSF |
| 543200 | U | |

← changed from 8 to 9

DATABASE FOR CHECK RISK DECISIONS POPULATED WITH CHECK ACTIVITY DATA FROM BANKS OF FIRST DEPOSIT

BACKGROUND OF THE INVENTION

Customers receive their blank checks from a payor (financial) institution. A payor institution is thus a paying financial institution on whose account a check is drawn and by whom it is paid.

Check clearing is the process of reconciling payments among parties associated with a check-based financial transaction. Most checks are processed in the following manner: The entity to whom the check is made out (the payee) deposits the check in his or her bank (the bank of first deposit or the depository bank). If the checkwriter's (the payor) account is in the same bank, the check is "on-us" and it is processed at the bank. Otherwise, the physical check travels, often via a financial intermediary, to the payor's institution or bank (the paying financial institution or bank), and finally to the payor, who receives the canceled checks and/or an account statement of the canceled checks on a periodic basis, typically monthly. The checks that must travel (interbank transit checks) may be handled by multiple institutions. If the payor has insufficient funds in his or her account to clear the check, or if the paying financial institution does not honor the check for other reasons, the check travels back to the bank of first deposit and possibly back to the payee. The payee suffers a payment loss on checks that do not clear.

The figures in the present specification illustrate both the prior art and the present invention depict "paper check processing." However, there are other financial instruments, such as debit cards, electronic checks (echecks), and Automated Clearing House (ACH) debit system transactions, which are ultimately tied into the checking account of a payor institution, and thus are functionally equivalent to paper checks. For simplicity, both the prior art descriptions and the present invention collectively refer to all of these types of financial instruments as "checks."

Figure 1:
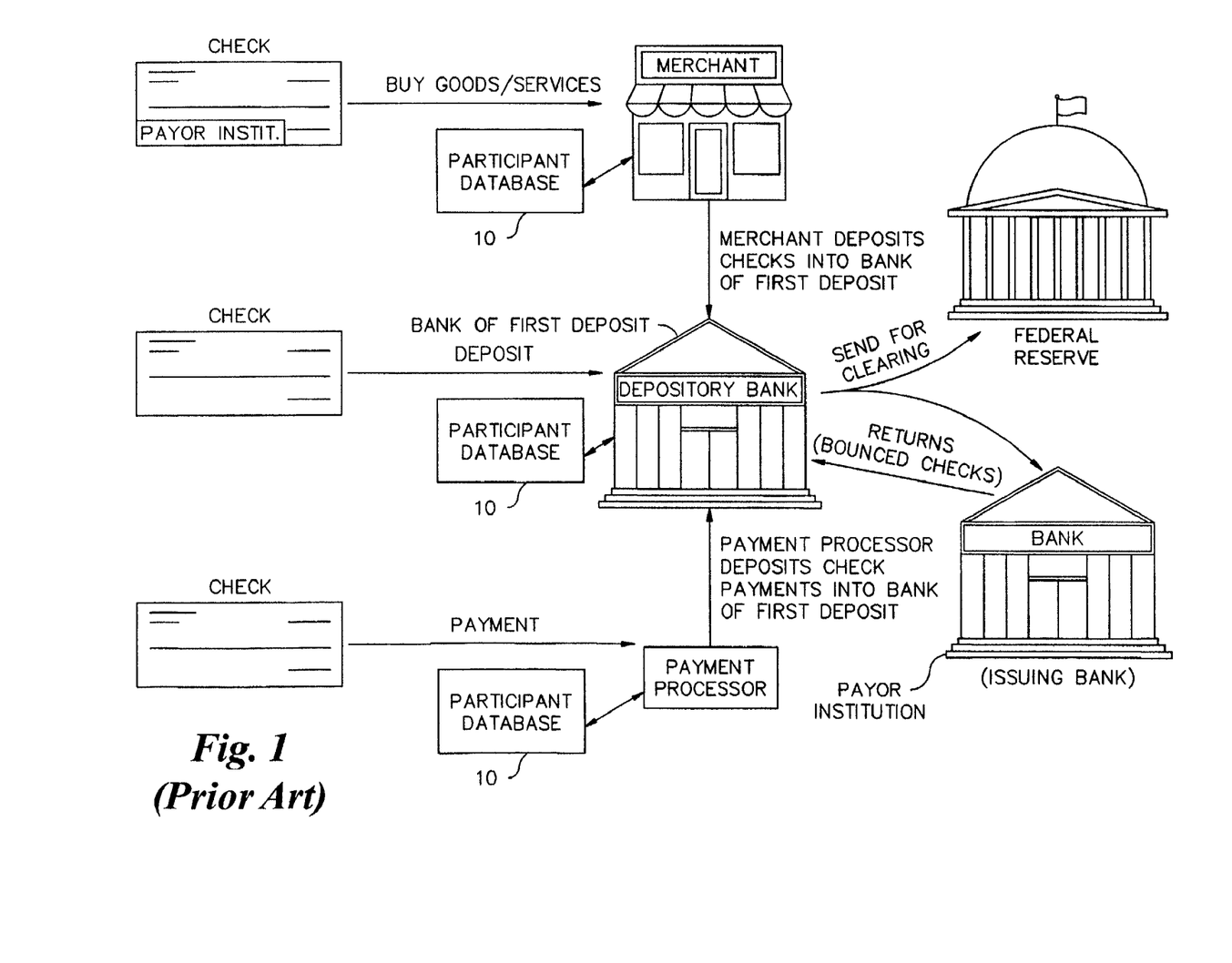
FIGS. 1-3 are schematic block diagrams of conventional check risk decision and check clearing processes.

FIG. 1 shows examples of three conventional channels of check activity for use of the customer's checks. In one channel, a customer presents a check to a merchant to buy a product or service. The merchant, in turn, deposits the check into a "bank of first deposit," also known as the "depository bank." In a second channel, a customer deposits a check directly into a bank of first deposit (the check may or may not be drawn on the bank of first deposit). In a third channel, the customer makes a payment to a payment processor. Like the merchant, the payment processor, in turn, deposits the check into a bank of first deposit. The bank of first deposit sends all checks (other than its own) to be cleared to the Federal Reserve and/or directly to the payor institution (e.g., payor bank).

FIG. 1 of U.S. Pat. No. 5,175,682 (Higashiyama et al.) and the corresponding description on column 1 of this patent provides a general overview of one conventional check clearing process for the merchant channel discussed above. In FIG. 1, the merchant bank 103 is the bank of first deposit, and the issuing bank 106 is the payor institution that issued the customer a checking account on which check 101 is drawn.

A "return item" is a check that is returned unpaid by the paying (payor) institution to the bank of first deposit, usually for insufficient funds. These bounced checks are reported back to the bank of first deposit in a "returns file." FIG. 2 of the present specification illustrates FIG. 1 of U.S. Pat. No. 5,175,682 appended to show returns being sent by the issuing bank 106 to the merchant bank 103. A similar flow of returns occur in FIG. 1 of the present specification. (Return items that flow out of the payor institution are referred to as "outgoing returns," whereas return items that are received by a bank of first deposit are referred to as "incoming returns.")

Figure 2:
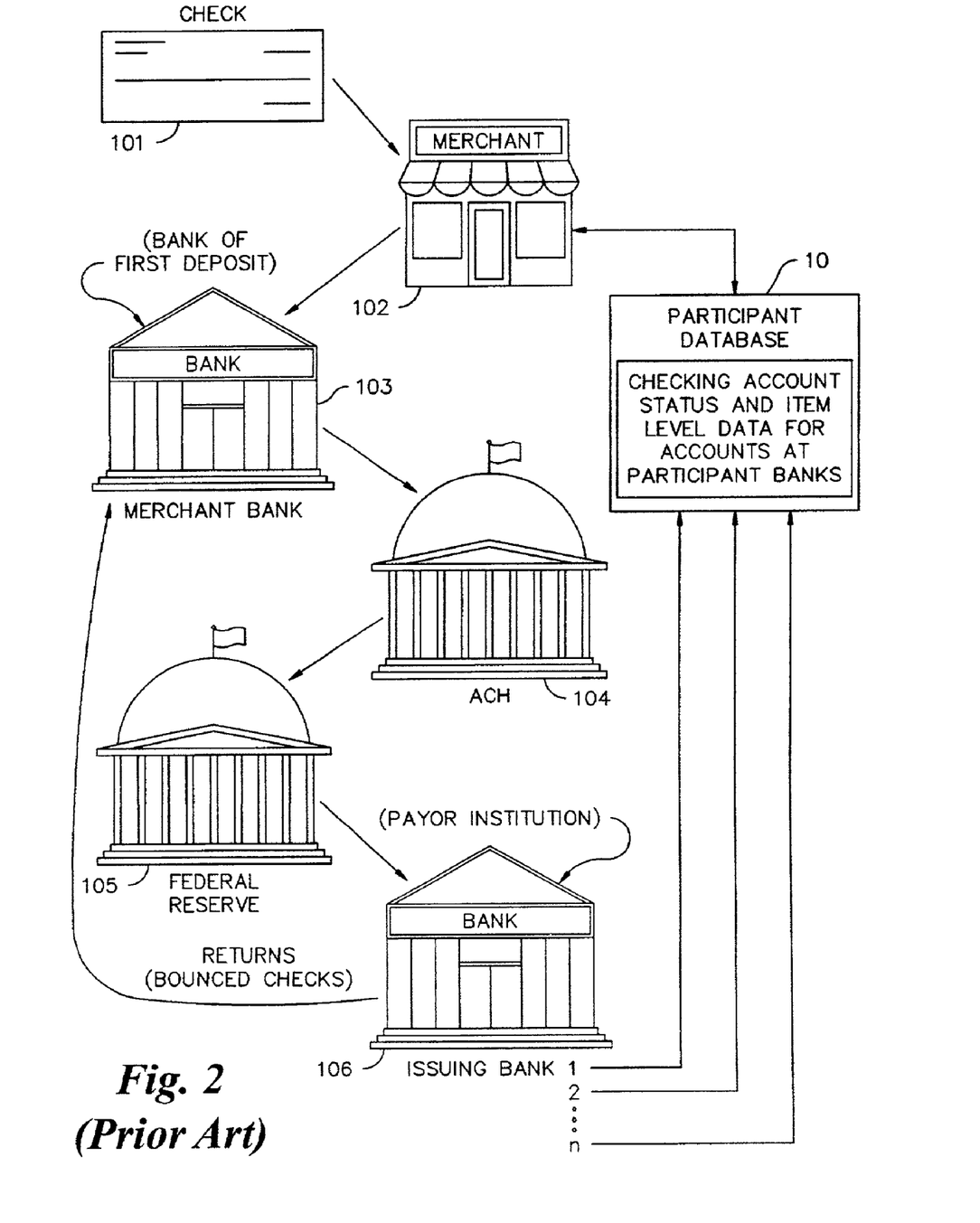

FIGS. 1 and 2 of the present specification also shows a prior art check risk decision process associated with a risk assessment service. A merchant, bank of first deposit, or payment processor may subscribe to a service that assesses the risk that a check will be returned on an account based on checking account status and item level data provided by the payor institution. This may be done immediately or in an overnight batch process.

The risk assessment service maintains a single "participant database" 10 (shown in separate blocks in FIG. 1 for each channel for ease of illustration) which is populated on a daily basis with the checking account status and item level data of accounts at certain payor institutions (i.e., the participants) that belong to a member service or member network. FIG. 2 also shows the role of the participant database 10.

Figure 3:
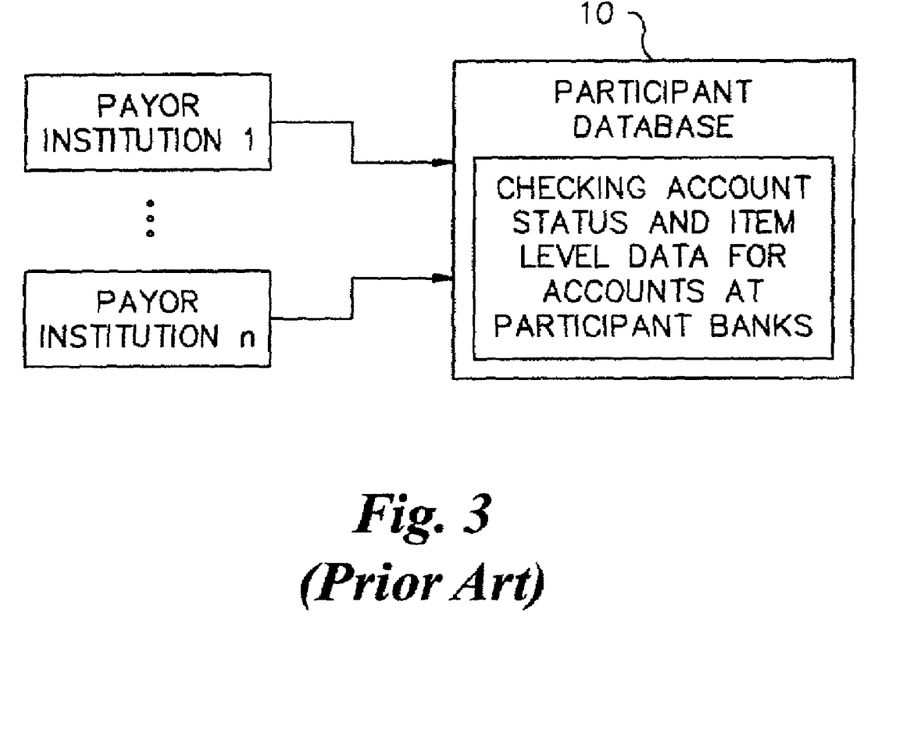

FIG. 3 shows that the prior art participant database 10 is populated by a daily flow of checking account status and item level data from each of the participant payor institutions. Some examples of a checking account status data are provided below (meaning of the status is noted in parenthesis where needed for a full understanding):

PRESENT (balance is greater than zero)
NEW ACCOUNT
CLOSED
NSF STATUS (balance is less than zero)
Some examples of item level data are provided below:
STOP PAYMENTS
EARLY OUTGOING RETURN NOTICES Depending upon the information in the participant database 10, along with other pieces of key information such as the depositor's current balance, number of returns, past experience, a depository bank or institution may place an extended hold on the deposit if there is reason to doubt collectability. In the payment world, a payment processor may use this information to make a decision regarding whether or not to open the line of credit or "open to buy" until the check clears. A merchant may also use the information to decline to accept the check. The participant database is a highly reliable source of data because it is populated with actual checking account status and item level data received directly from the payor institutions. Accordingly, merchants, banks of first deposit, and payment processors can make accurate check risk decisions (e.g., check acceptance decisions and check hold decisions). Primary Payment Systems, Inc. (PPS), Scottsdale, Ariz., provides advance notice of potential check returns to inquiring customers using the participant database described herein.

One significant deficiency with the conventional schemes described above is that not all payor institutions belong to (i.e., are members of) the risk assessment service that maintains the participant database, and thus not all checking accounts have checking account status and item level data present in the participant database. If a check is presented from an account of a non-participating payor institution, then the merchant, bank of first deposit, or payment processor must rely on other sources of data to make a check risk decision, such as calling the payor institution directly, using other check verification services that obtain data from other sources, or reviewing past check history records for the customer that is presenting the check or the account that the check is drawn on. Entities that accept checks, and which already use services such as those provided by PPS, would like to rely upon a better and more accurate source of data when determining the likelihood that a check from a specific checking account that is not in the participant database will be returned so that better and more accurate check risk decisions can be made.

Check verification services currently used by merchants, banks and the like in making check acceptance decisions have many deficiencies. Some of the deficiencies are discussed below:

1. Services that use "negative file" databases which contain checking account numbers that are known to be closed or delinquent are typically based on return experiences from selected merchants, and thus are limited in scope and may become stale or outdated.

2. Retail merchants, financial institutions, check cashing services, check printing companies, collection agencies, and government agencies routinely report incoming returns (e.g., bounced checks), closed accounts, new check orders, and the like to private services, who, in turn, use this information in developing proprietary databases such as negative files for check verification. However, the vast majority of checking account activity data consists of checks that clear with no problems. The proprietary databases either do not capture such activity data, or they capture it from sources that are limited in scope (e.g., selected merchants as described in the previous paragraph). Incoming return data has much better meaning when combined with transit items which include therein checks that will ultimately clear with no problem. Consider, for example, a checking account holder who writes 100 checks in one year, averaging $40.00, but then accidentally bounces one $15.00 check during the course of the year. Many existing check verification services will flag the account as a problem account due to the bounced check, when, in fact, the likelihood of a check clearing on the account is extremely high.

3. Some check verification services use predictive models based on multiple variables to determine the level of risk associated with a particular check transaction. However, the predictive models may not take into account actual check activity behavior of the check presenting customer. Thus, a customer who has a stellar check activity record might fit a profile of a bad check writer and be negatively treated as a result of the profile which may not even factor in actual check activity. U.S. Pat. No. 5,679,938 (Templeton et al.) describes the use of a typical predictive modeling system.

4. Conventional check verification databases that are built from retailer (merchant) check activity data inherently miss a large percentage of checking accounts that are rarely, if ever, used for consumer-type purchases. Furthermore, a large percentage of retailers do not subscribe to, or report check activity to, a check acceptance service, and thus the databases do not contain a complete picture of the check-writing activity of the checking accounts that even make it into the databases. Positive files (positive databases), negative files (negative databases) and velocity/risk databases, which are typically created by check acceptance services used by retailers, suffer from these deficiencies. Even the largest commercially available services today have no checking account activity data on about half or more of active checking accounts.

Despite the multitude of existing check verification and acceptance services, there is still an unmet need for a service that can be used to make statistically significant check risk decisions based at least in part on actual checking account activity data for a greater percentage of active checking accounts, and which can be used with confidence by merchants, banks and payment processors alike. The present invention fulfills such a need.

BRIEF SUMMARY OF THE INVENTION

One preferred embodiment of the present invention provides a computer-implemented process which populates a database of checking account with statistical data regarding the likelihood that a check from a specific checking account will be returned. The process includes at least the following steps:

1. Receive checking account activity data directly from a plurality of banks of first deposit. The checking account activity data includes transit items and incoming returns.

2. Analyze the checking account activity data using a statistical model to determine the likelihood that a check from a specific checking account will be returned. As part of the analysis, it is first determined if there is enough checking account activity data for a specific checking account number to make a statistically significant determination of the likelihood that a check from a specific checking account will be returned. If so, then the database is populated with checking account data for that checking account number. If not, then the checking account data for that specific checking account number is placed in a hold queue.

3. Populate a database with checking account data, including checking account numbers, and likelihood that a check from a specific checking account number will be returned.

4. Periodically, repeat steps 1 and 2 with new checking account activity data and update the database of checking account data with the new checking account activity data. As part of the periodic review, the checking account data for any checking account numbers in the hold queue are reviewed to determine if the new data provides enough checking account activity data to make a statistically significant determination of the likelihood that a check from a specific checking account will be returned. If so, then the database is populated with those checking account numbers and they are removed from the hold queue.

In another preferred embodiment of the present invention, check risk decisions are made using the database. Checking account data of a check presented for deposit, payment or clearing is received, and the information in the database is used to make a check risk decision.

In yet another preferred embodiment of the present invention, a computer-implemented process is provided for making a check risk decision using a first database populated with checking account status and item level data from checking accounts of payor institutions that belong to a member service, and a second database that is populated with checking account data of checking accounts that are not held by payor institutions that belong to the member service. The second database includes checking account numbers and likelihood that a check from a specific checking account number will be returned as determined by a statistical model. The second database is populated by checking account activity data, including item files and incoming returns, received directly from a plurality of banks of first deposit. The inquiry process includes at least the following steps:

1. Inquirer submits account number and routing and transit data of a presented check.

2. Use the first database to make a check risk decision for checking accounts of payor institutions that belong to the member service.

3. Use the second database to make a check risk decision for checking accounts that are not held by payor institutions that belong to the member service.

In one preferred implementation of the embodiments described above, the checking account activity data is received solely from a plurality of banks of first deposit, and the check risk decision is a check acceptance decision, a check hold policy decision, or an open to buy decision. The item level data in the first database may include stop payments and early outgoing return notices.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used herein for convenience only and is not to be taken as a limitation on the present invention. In the drawings, the same reference letters are employed for designating the same elements throughout the several figures.

1. Overview of Present Invention

Banks of First Deposit receive incoming returns on a daily basis for checks that they previously submitted for clearing. The checking account data from the incoming returns are received in "incoming returns files." (No "early notice returns" are included in these files.) Each business day, Banks of First Deposit also receive a large volume of checks that they accept for deposit from merchants, consumers, small businesses, corporations, and payment processors. These checks are sent for clearing, typically on a daily basis. ("On us" checks are cleared within the bank.) The checks that the Banks of First Deposit receive and which must be cleared are "transit items," as discussed above. Checking account data from the daily transit items are consolidated into "transit item files." The present invention taps the rich source of information contained in the incoming returns files and the transit item files, and then uses the information to create a "non-participant database" that can work alongside of the existing participant database, or as a stand-alone database. In this manner, merchants, banks, and payment processors can further reduce payment losses from bad checks.

Figure 4:
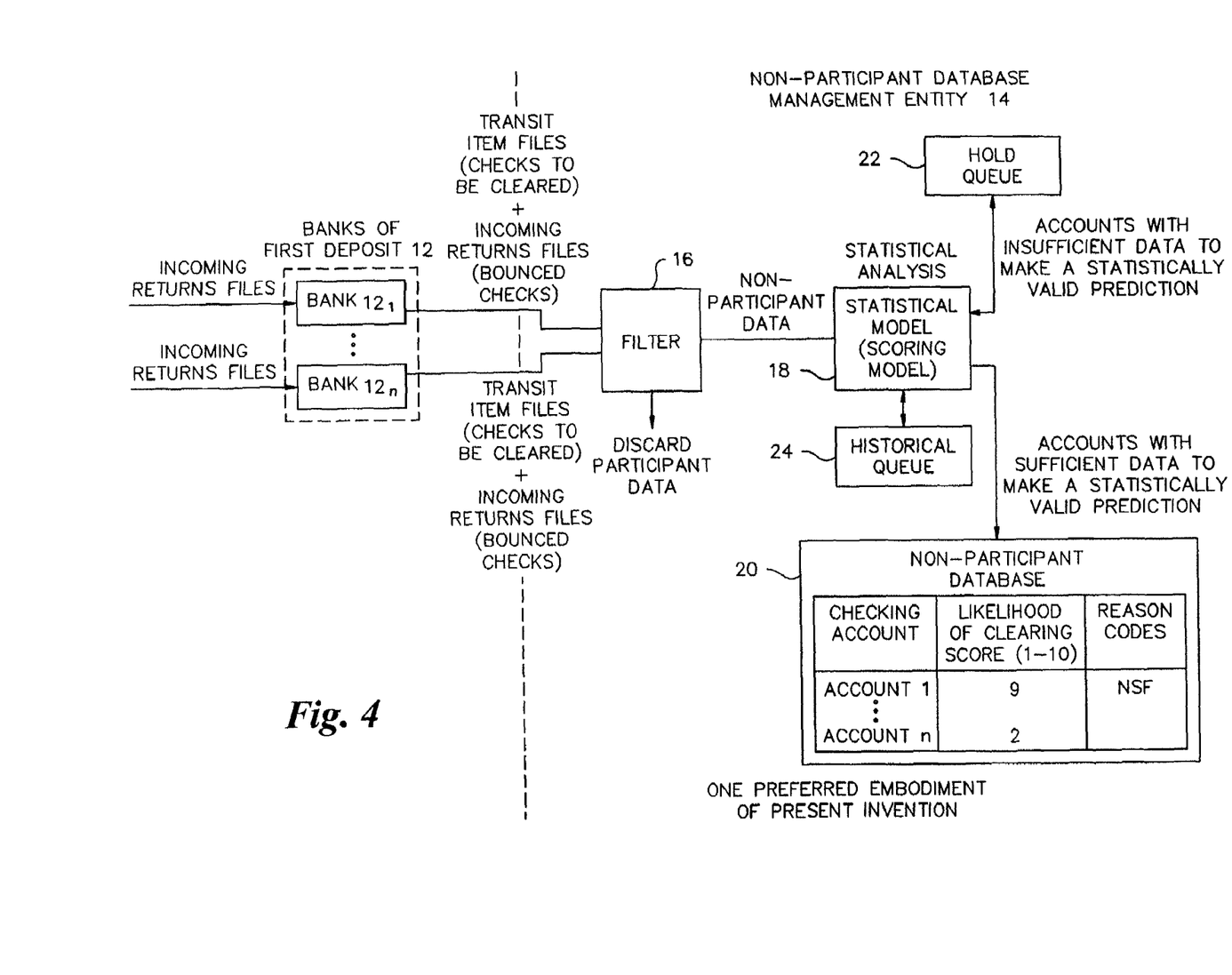
FIGS. 4-5 are schematic block diagrams of check risk decision and check clearing processes in accordance with the present invention.

FIG. 4 shows how financial institution data from banks of first deposit 12 are to be used. The banks transmit their transit item files (including checks to be cleared) and incoming returns files (including bounced checks) on a daily basis to a non-participant database management entity 14. This entity removes participant data via filter 16 since that data is already collected and accounted for in the conventional participant database scheme.

Transit item files contain the MICR line data including the routing and transit number, account number, tran code or its equivalent if applicable, serial number (check number), dollar amount and date. Incoming returns contain the routing and transit number, account number, tran code or its equivalent if applicable, serial number (check number), date and reason(s) for return.

The non-participant data is applied to a statistical model 18 (also, referred to as a "scoring model") which uses statistical analysis to determine the likelihood that a check from a specific non-participant checking account will return (i.e., not clear). The results of the statistical model are used to populate a non-participant database 20. If there is insufficient data about a checking account to make a valid determination, then the data is sent to a hold queue 22. As additional data arrives for a checking account that is in the hold queue 22, the hold data is reapplied to the statistical model 18. The additional data is also used in association with a historical queue 24 to make fresh determinations of the likelihood of clearing for checking accounts that are in the non-participant database 20. That is, the statistical model 18 is periodically rerun using fresh data, and the non-participant database 20 is updated with new scores. Over time, many of the accounts in the hold queue 22 should migrate to the non-participant database 20. Eventually, the non-participant database 20 will include likelihood data for most of the non-participant checking accounts.

In the preferred embodiment of the present invention, any new checking account numbers that pass through the filter 16 and which are not already in the non-participant database 20 are added to the non-participant database 20, even if no likelihood data is available due to the inability to make a valid determination. These checking account numbers are flagged and stored in the hold queue 22. These accounts are not scored. In an alternative embodiment, unscoreable checking account numbers are not entered into the non-participant database 20.

Figure 5:
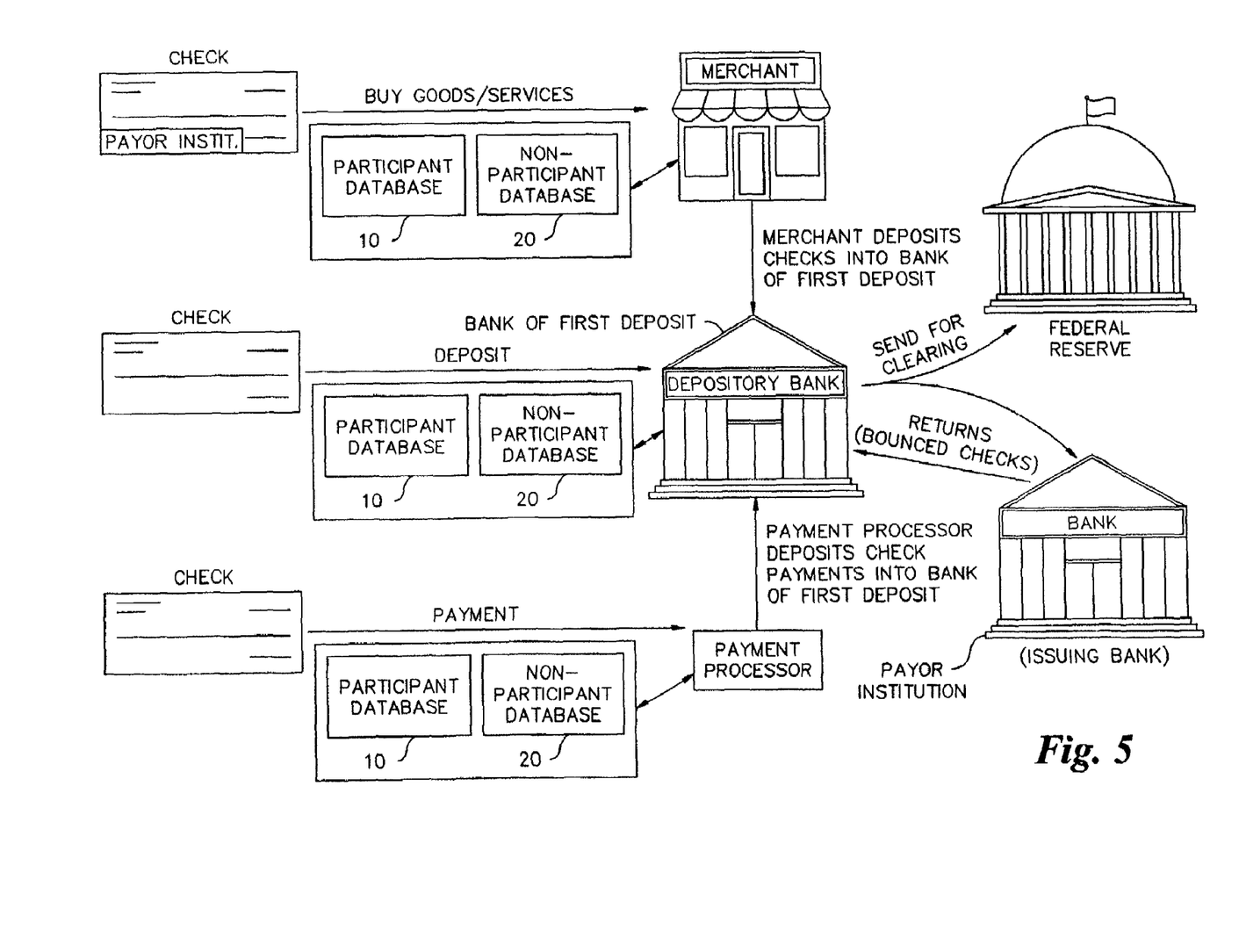

FIG. 5 is similar to FIG. 2, except that FIG. 5 shows the non-participant database 20 working alongside the participant database 10. A merchant (or alternatively, a merchant processor or check acceptance company), depository bank (or alternatively, a depository bank processor), or payment processor evaluates the risk of the check by using the participant data via the participant database process described in FIG. 1. However, checks from a non-participant checking account are run against the accounts in the non-participant database 20. If the checking account is in the non-participant database and the inquirer is satisfied with the level of risk associated with the account, as indicated by a score, then the inquirer will accept the check and/or apply any appropriate hold policies to the check. Alternatively, the inquirer may also combine the score from the non-participant database 20 with other information about the check presenter in making check acceptance and/or check hold decisions. If the checking account of the presented check does not appear in either database 10 or 20, or if the checking account of the presented check appears in the database 20 with an unscoreable indicator, then the inquirer will use other information to evaluate the risk of the check.

Figure 6:
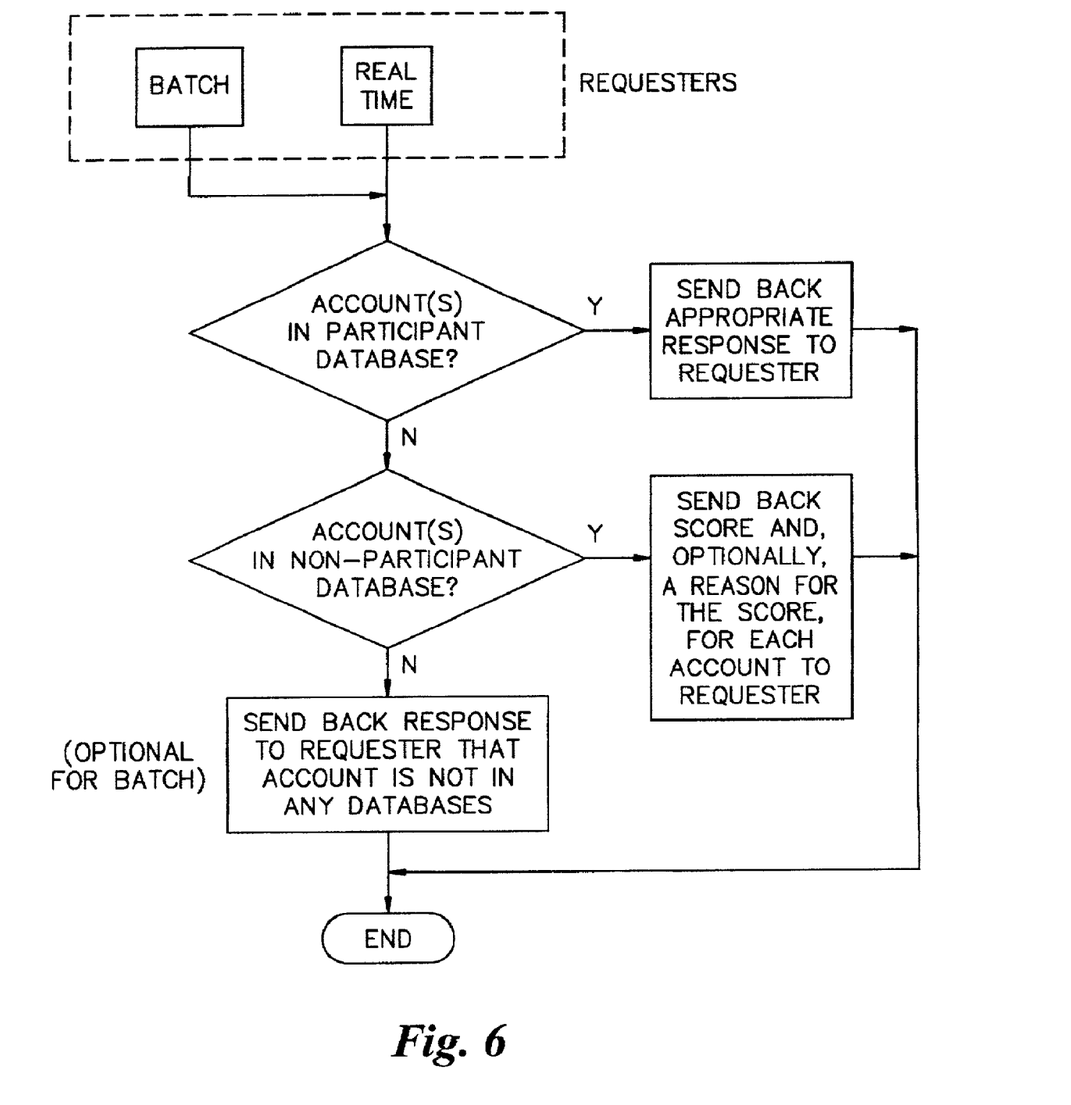
FIG. 6 is a flowchart of the process shown in FIG. 5.

FIG. 6 is a flowchart of the process shown in FIG. 5. The process begins when an entity makes an inquiry regarding one or more checking account numbers. The inquiry may be part of a batch process or a real time process. The inquiry generates a hit report with scores for each hit, and, in some instances, up to five reason codes for the score. Reason code(s) are included only for certain types of inquiries from certain entities.

A real time inquiry can be made by swiping a check with a MICR reading device. There are numerous MICR capture devices, including, but not limited to, dial-up MICR readers which directly access a database (e.g., PPS's database), and integrated online services which connect through merchants or teller windows. In one preferred embodiment, the check reader dials into a database containing the databases 10 and 20, and receives a response therefrom. Responses from the database 20 include the score data, and, optionally, reason codes(s) if any exist.

If an account is not in the database, the requester is informed of this fact. In one alternative embodiment, this step occurs only for real time inquiries and is not performed for batch inquiries. The remaining steps in the process shown in FIG. 6 are self-explanatory.

One important feature of the present invention is that the non-participant database 20 is built from all transit item files and incoming returns files supplied by banks of first deposit 12. In one preferred embodiment of the present invention, the non-participant database is built solely from such data. Banks of first deposit are a reliable, current, comprehensive, and broad-based source of checking account activity data, and thus are an ideal candidate for building the non-participant database. Building the non-participant database 20 from transit item files and incoming returns files supplied by banks of first deposit provide significant advantages over conventional approaches to building check acceptance/verification databases, such as positive databases, negative databases and velocity/risk databases. For example, banks of first deposit receive checks from all types of checking accounts (e.g., individual household accounts, commercial/business accounts, institutional accounts), and thus capture data from significantly more accounts and for significantly more types of payments than services that capture only merchant-based checking activity. The non-participant database 20 is updated on a nightly basis as checks are deposited and as checks are returned. The data is therefore very current and accurate. Furthermore, incoming returns are received by the non-participant database 20 before the merchant receives them, since returns are sent first to the depository bank and then to the merchant. Thus, databases that are built from merchant-reported returns will not be as current as the returns logged into the non-participant database 20.

One useful application of the present invention is to allow entities that accept checks to make check hold decisions that are more accurately tailored to the likely risk of a check being returned. The Federal Reserve Board specifies the rules for check holds in Regulation CC, Availability of Funds and Collection of Checks.

Based on the government regulations for hold policies, a large percentage of checks fall into one or more categories that permit a hold greater than one business day, and thus there will be discretion in the hold policy, particularly for deposits eligible for exception holds. In fact, the very existence of a statistically created database that predicts the likelihood of a particular check being returned allows entities that receive checks for payment or clearing to legitimately classify a check as being eligible for exception holds, and thus a longer hold period.

In an alternative embodiment of the present invention, the participant database 10 and non-participant database 20 are used in the following manner to prevent and reduce losses by payment processors, such as credit card companies:

1. A credit card payment is made by check.
2. The check is submitted to the credit card company for payment.
3. The payment processor uses a service such as PPS's PRIME CHEK® to verify the status of the account if it is in the participant database 10, or the likelihood of a return if it is in the non-participant database 20. Depending upon the status or risk of the account, the credit card company makes a decision to place an extended hold on the line of credit until the check actually clears. This protects the credit card company from opening the line of credit to buy before the check clears, thereby preventing customers from implementing "bust out" schemes. The non-participant database 20 significantly expands the number of accounts that can be checked in this manner.

2. Detailed Description

Figure 7:
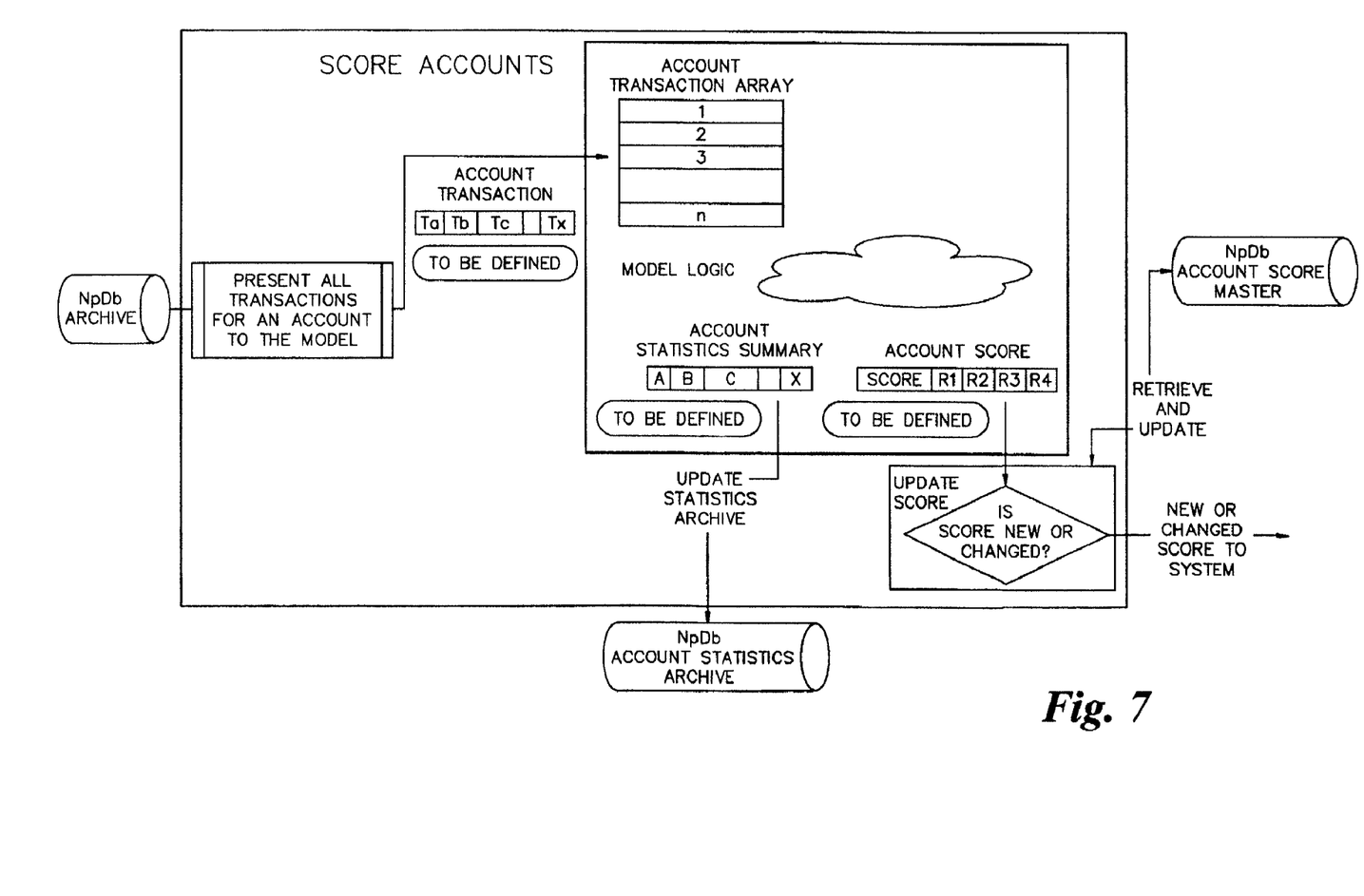
FIG. 7 shows a block diagram of one suitable scoring model process for use in one preferred embodiment of the present invention.

FIG. 7 shows a block diagram of one suitable scoring model process for use in one preferred embodiment of the present invention. The scoring model has a plurality of weighting factors. The actual weighting factors may differ based on fine-tuning and honing of the scoring model, and will change over time. Scoring models are usually proprietary. However, the process for creating a scoring model is well-known. Data is collected and then statistically reviewed to identify patterns of events which predict an outcome. The predictive characteristics are identified and then built into a model.

In alternative embodiments of the present invention, neural models or rules models may be used instead of statistical models and the scope of the present invention includes such variations.

FIGS. 8-11 describe how to populate and maintain the non-participant database 20 (NPDB) by showing how a very small set of sample data is processed.

Figure 8:
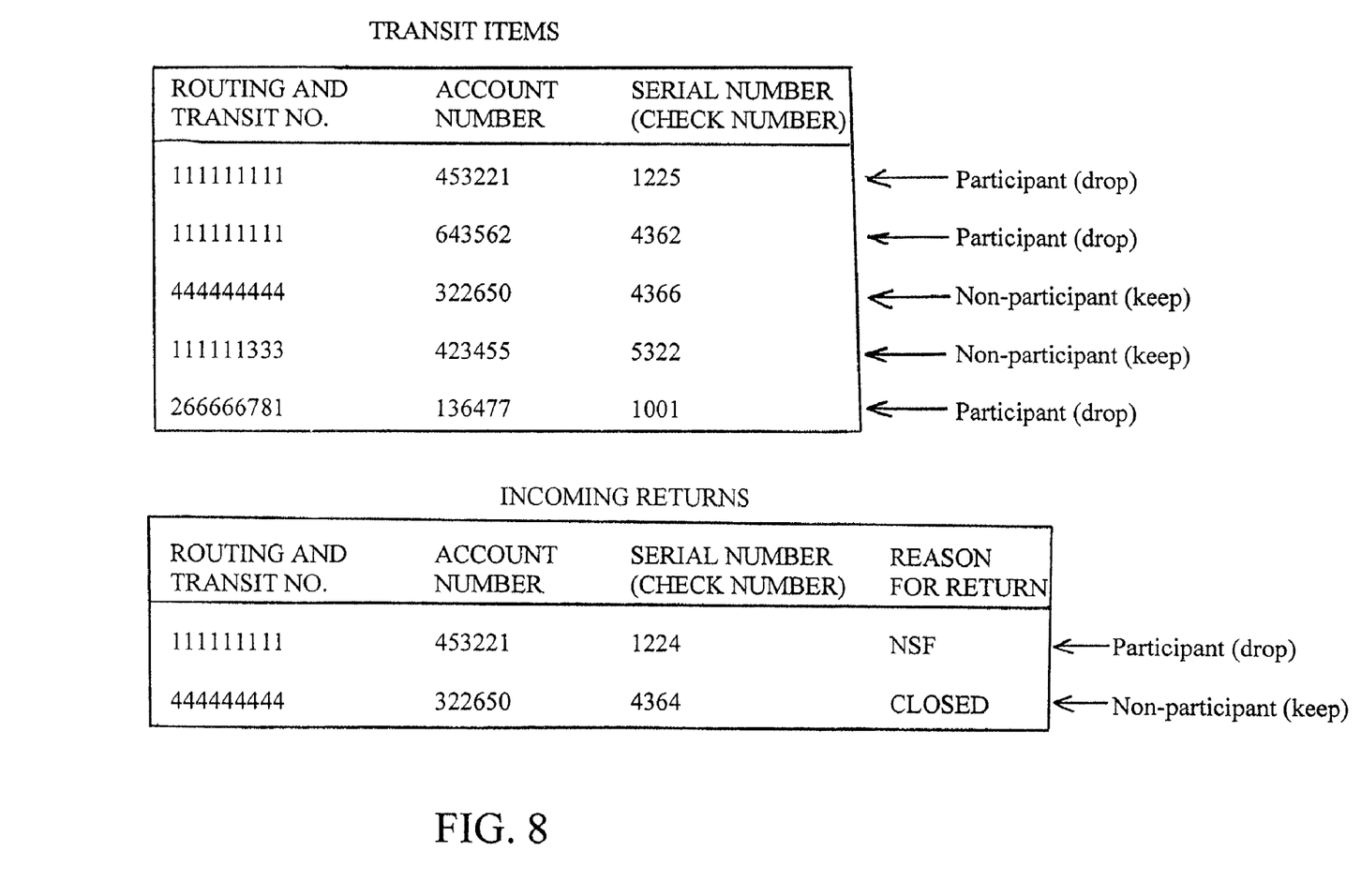
FIGS. 8-12 show how to populate and maintain the non-participant database.

FIG. 8 shows how data is contributed to the NPDB. The contributor (bank of first deposit) sends its transit item files and incoming returns files. As described above, transit item files contain the MICR line data including the routing and transit number (R&T), account number, tran code or its equivalent if applicable, serial number (check number), dollar amount and date. Incoming returns contain the routing and transit number, account number, tran code or its equivalent if applicable, serial number (check number), date and reason(s) for return. For simplicity, FIG. 8 shows only some of these fields.

The routing and transit number of each transit item and incoming return is used to identify participant and non-participant accounts. This non-participant account data is filtered and sent to the NPDB. FIG. 8 shows five entries from a transit item file. Three entries belong to participants and thus are dropped. The remaining two entries are non-participant accounts and thus are kept. FIG. 8 also shows two entries from an incoming returns file. One entry belongs to a participant and thus is dropped. The other entry is a non-participant account and is kept.

Figure 9:
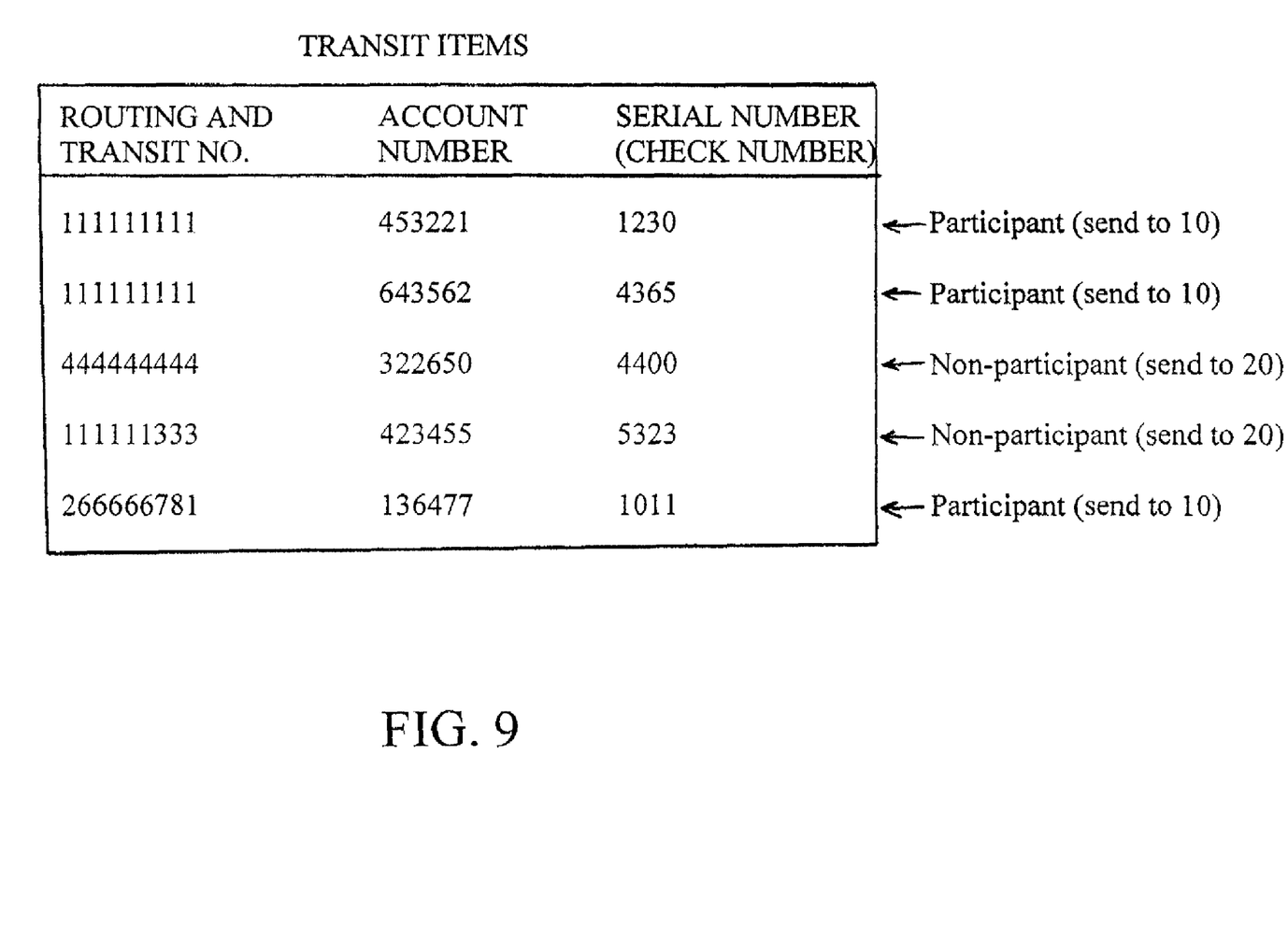

FIG. 9 shows how inquiries are made to the respective participant database and NPDB by a customer of the system (e.g., bank, merchant, payment processor). In this example, the inquiry is a batch mode inquiry on a transit item file made before the checks in the file are sent for clearing, and is being made to determine the hold policy to apply to each of the checks. (The bank has already accepted the checks for deposit.) For simplicity, the accounts in the transit item file are the same as the accounts in the transit item file shown in FIG. 8. The transit item file in FIG. 9 was created shortly after the transit item file in FIG. 8, and thus the check numbers are higher in the FIG. 9 file.

Referring to FIG. 9, the routing and transit number of each transit item is used to identify participant and non-participant accounts. The participant transit items are sent to the participant database 10 for matching against accounts and creation of a first hit report file. The hold policy of each check is then decided based on the checking account status and item level data stored therein. Each bank may have its own rules regarding how checking account status and item level data are used to set the hold policy or any other check risk decision. The non-participant transit items are sent to the non-participant database 20 for matching against accounts and creation of a second hit report file. The hold policy of each check is then decided based on the likelihood of clearing score, if one exists. Again, each bank may have its own rules regarding how a risk score is used to set the hold policy or any other check risk decision.

Figure 10:
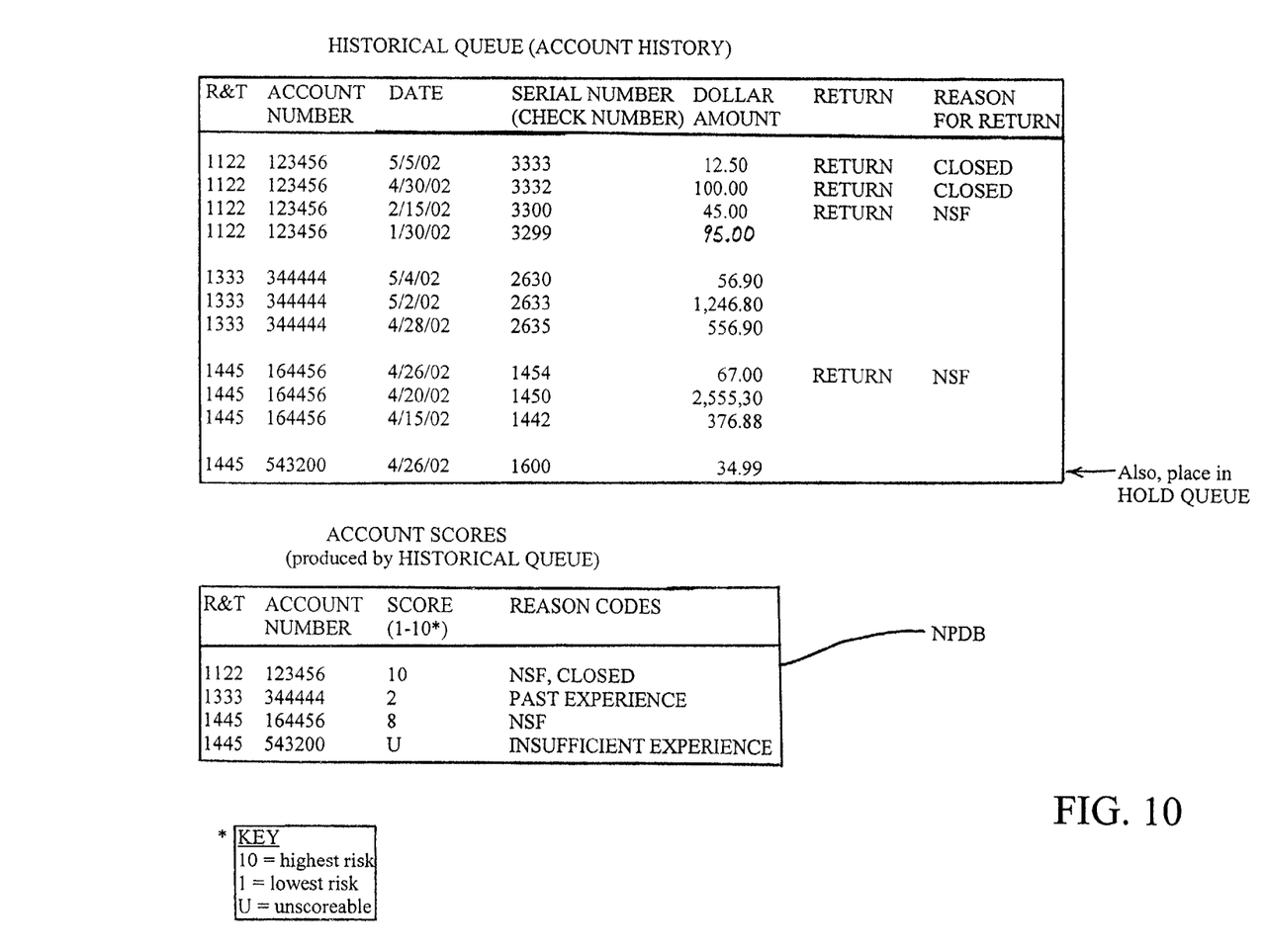

FIG. 10 shows non-participant checking account activity data stored in the historical queue 24 and the actual data stored in the NPDB. The historical queue 24 stores all transaction history data. As new data is contributed, the historical queue 24 is updated. The data in the historical queue is periodically fed to the statistical model which scores the accounts based on the historical transactions. Each account receives a score which is placed in the NPDB, as well as one or more reason codes that relate to the determination of the score. Good scores and bad scores may have reason codes.

FIG. 10 shows transaction data for four checking accounts. In this example, three or more transactions were deemed to be sufficient to make a statistically significant determination of the likelihood that a check from a specific account will be returned. The first account has four transactions, and the last three transactions were returned. This account receives the highest score (highest risk of a subsequent transaction not clearing). The second account has three transactions, all of which cleared. This account received a low score. The third account also has three transactions, but the most recent transaction was a return for insufficient funds. Accordingly, this account received a relatively high score. The fourth account has only one transaction and thus no score was developed for this account. The transaction data for the fourth account is also placed in the hold queue, and is moved out of the hold queue if, or when, a sufficient amount of transaction data becomes available to score the account.

Figure 11:
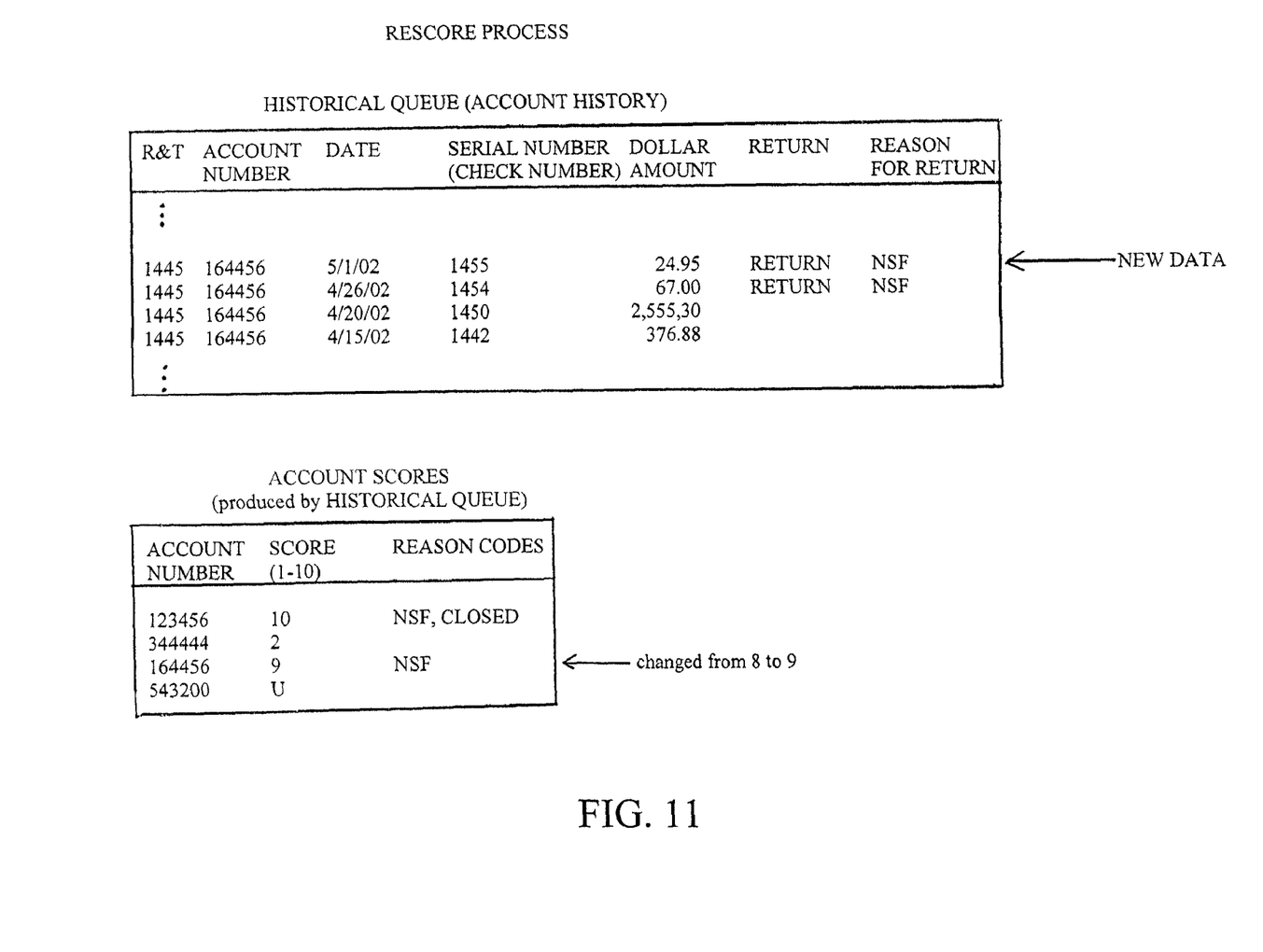

FIG. 11 shows the rescoring process for one account. As new transaction data becomes available for an account, it is added to the historical queue 24 and the account is rescored. The new score replaces the old score. Once the account is rescored, the account is updated on a nightly basis by the system. In FIG. 11, one new transactions appeared for account number 164456 in the latest daily update. The new transaction is another return for insufficient funds. Accordingly, the score for this account is increased from 8 to 9.

In another embodiment of the present invention, the non-participant database management entity 14 receives the transit item files and incoming returns files from a single entity which receives such files from some or all of the banks of first deposit. The single entity may be a check processor or a check clearing entity, such as a clearinghouse or the Federal Reserve. The Federal Reserve receives the most comprehensive flow of data, whereas an individual check processor may receive data from only a small number of banks of first deposit.

Figure 12:
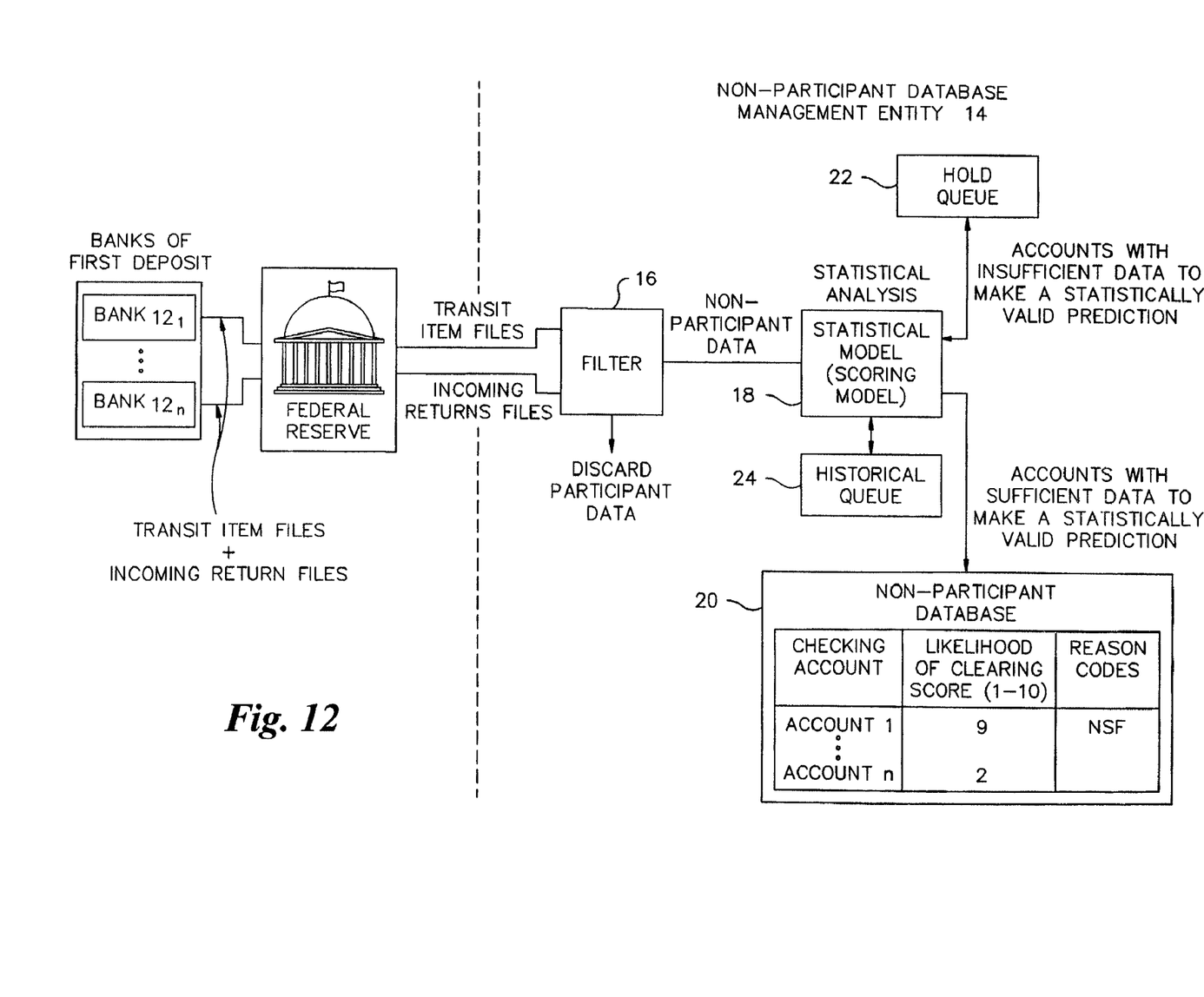

FIG. 12 shows a process wherein the non-participant database management entity 14 receives the transit item files and incoming returns files from the Federal Reserve which receives such files from a plurality of banks of first deposit.

As discussed above, for simplicity, both the prior art descriptions and the present invention collectively refer to financial instruments such as debit cards, electronic checks (echecks), and Automated Clearing House (ACH) debit system transactions as "checks." The scope of the present invention includes these other forms of financial transactions which are ultimately tied into the checking account of a payor institution, and thus are functionally equivalent to paper checks.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A computer implemented method of populating a database of checking account with statistical data regarding the likelihood that a check from a specific checking account will be returned, the method comprising: (a) receiving checking account activity data directly from a plurality of banks of first deposit, the checking account activity data including: (i) transit items, and (ii) incoming returns; (b) analyzing the checking account activity data received from the banks of first deposit using a statistical model to determine the likelihood that a check from a specific checking account will be returned, wherein the statistical model utilizes a plurality of weighting factors applied to the transit items and the incoming returns in order to create a score: (c) populating a database with checking account data received from the banks of first deposit including: (i) checking account numbers, and (ii) likelihood that a check from a specific checking account number will be returned; and (d) periodically repeating steps (a) and (b) with new checking account activity data and updating the database of checking account data with the new checking account activity data;

wherein step (b) further comprises determining if there is enough checking account activity data for a specific checking account number to determine the likelihood that a check from a specific checking account will be returned, and if not, then flagging the checking account data for that specific checking account number and step (d) further comprises periodically reviewing the flagged checking account numbers and populating the database with checking account data for any flagged checking account numbers which are determined to have enough checking account activity data to make a determination of the likelihood that a check from a specific checking account will be returned.

2. The method of claim 1 wherein step (b) further comprises determining if there is enough checking account activity data for a specific checking account number to determine the likelihood that a check from a specific checking account will be returned, and if not, then flagging the checking account data for that specific checking account number and populating the database with only the checking account number for that specific checking account, and step (d) further comprises periodically reviewing the flagged checking account numbers and populating the database with the likelihood data for any flagged checking account numbers which are determined to have enough checking account activity data to make a determination of the likelihood that a check from a specific checking account will be returned.

3. The method of claim 1 wherein step (a) further comprises receiving the checking account activity data solely from a plurality of banks of first deposit.

4. A computer implemented method of populating a database of checking account with statistical data regarding the likelihood that a check from a specific checking account will be returned, the method comprising: (a) receiving checking account activity data from a single entity that receives such data from a plurality of banks of first deposit, the checking account activity data including: (i) transit items, and (ii) incoming returns; (b) analyzing the checking account activity data received from the banks of first deposit using a statistical model to determine the likelihood that a check from a specific checking account will be returned, wherein the statistical model utilizes a plurality of weighting factors applied to the transit items and the incoming returns in order to create a score; (c) populating a database with checking account data received from the banks of first deposit including: (i) checking account numbers, and (ii) the score which indicates the likelihood that a check from a specific checking account number will be returned; and (d) periodically repeating steps (a) and (b) with new checking account activity data and updating the database of checking account data with the new checking account activity data.

5. The method of claim 4 wherein the single entity is the Federal Reserve.

6. The method of claim 4 wherein the single entity is a clearinghouse.

7. The method of claim 4 wherein the single entity is a check processor.

8. A computer implemented method of populating a database of checking account with statistical data regarding the likelihood that a check from a specific checking account will be returned, the method comprising: (a) receiving checking account activity data directly from a plurality of banks of first deposit, the checking account activity data including: (i) transit items, and (ii) incoming returns; (b) filtering out at least a majority of a participant checking account activity data in order to leave non-participant checking account activity data; (c) analyzing the non-participant checking account activity data received from the banks of first deposit using a statistical model to determine the likelihood that a check from a specific checking account will be returned, wherein the statistical model utilizes a plurality of weighting factors applied to the transit items and the incoming returns in order to create a score; (d) populating a database with non-participant checking account data received from the banks of first deposit including: (i) checking account numbers, and (ii) likelihood that a check from a specific checking account number will be returned; and (e) periodically repeating steps (a), (b), and (c) with new checking account activity data and updating the database of checking account data with the new checking account activity data.

9. The method of claim 8 wherein step (b) further comprises determining if there is enough non-participant checking account activity data for a specific checking account number to determine the likelihood that a check from a specific checking account will be returned, and if not, then flagging the checking account data for that specific checking account number and step (e) further comprises periodically reviewing the flagged checking account numbers and populating the database with checking account data for any flagged checking account numbers which are determined to have enough checking account activity data to make a determination of the likelihood that a check from a specific checking account will be returned.

* * * * *